US009124678B2

(12) United States Patent
Zajeski et al.

(10) Patent No.: US 9,124,678 B2
(45) Date of Patent: Sep. 1, 2015

(54) POWERED PORTABLE HANDLE REMOTE SYSTEM FOR MOBILE COMMUNICATIONS DEVICE

(71) Applicants: Robert Benedict Zajeski, Homer Glen, IL (US); Ben Lynch Zajeski, Plainfield, IL (US)

(72) Inventors: Robert Benedict Zajeski, Homer Glen, IL (US); Ben Lynch Zajeski, Plainfield, IL (US)

( * ) Notice: Subject to any disclaimer, the term of this patent is extended or adjusted under 35 U.S.C. 154(b) by 333 days.

(21) Appl. No.: 13/725,690

(22) Filed: Dec. 21, 2012

(65) Prior Publication Data
US 2014/0179372 A1    Jun. 26, 2014

(51) Int. Cl.
| H04B 1/38 | (2015.01) |
| H04M 1/02 | (2006.01) |
| H04M 1/725 | (2006.01) |
| G06F 1/16 | (2006.01) |
| H04M 1/04 | (2006.01) |

(52) U.S. Cl.
CPC ........... *H04M 1/0254* (2013.01); *G06F 1/1632* (2013.01); *H04M 1/7253* (2013.01); *H04M 1/04* (2013.01); *H04M 1/72544* (2013.01)

(58) Field of Classification Search
CPC ..... H04M 1/04; H04M 1/0254; H02J 7/0044; H04B 1/3888; G06F 1/1626
USPC ................. 455/347, 352, 556.1, 557
See application file for complete search history.

(56) References Cited

U.S. PATENT DOCUMENTS

| 8,577,412 | B1 * | 11/2013 | Bishop ....................... 455/556.1 |
| 8,837,156 | B2 * | 9/2014 | Sun et al. ....................... 361/752 |
| 2003/0148740 | A1 * | 8/2003 | Yau et al. ......................... 455/90 |
| 2004/0246663 | A1 * | 12/2004 | Nuovo et al. .................. 361/679 |
| 2006/0111076 | A1 * | 5/2006 | Davie et al. .................... 455/347 |
| 2008/0031606 | A1 * | 2/2008 | Zax et al. ......................... 396/56 |
| 2010/0248655 | A1 * | 9/2010 | Yahagi et al. ................ 455/90.3 |
| 2013/0005401 | A1 * | 1/2013 | Rosenhan et al. ............ 455/557 |
| 2015/0065159 | A1 * | 3/2015 | Alpert et al. ................ 455/456.1 |
| 2015/0103651 | A1 * | 4/2015 | Kekki ............................ 370/230 |

* cited by examiner

*Primary Examiner* — Creighton Smith
(74) *Attorney, Agent, or Firm* — Howard B. Rockman; Mercedes V. O'Connor

(57) ABSTRACT

The powered portable handle remote system wirelessly controls a mobile communications device's application using wireless technology. It serves as a remote for the mobile communications device and as a handle to stabilize and hold the mobile communications device while using the mobile communications device. The powered portable handle remote system is a 3 piece system including a mobile communications device case, a powered handle remote, and a detachable section. The case has a unique built-in feature allowing it to be attached to the powered handle remote and the detachable section. The powered handle remote functions as a remote control using a set of buttons or a joystick to wirelessly control the mobile communications device. The powered handle remote separates into 2 pieces revealing a detachable section, such as a tripod adaptor, used to attach the case to a camera tripod or to support the mobile communications device case in itself.

2 Claims, 4 Drawing Sheets

| Drawing Legend | | | |
|---|---|---|---|
| 1 | Smartphone Case | 9 | Slide Action Button |
| 2 | Sliding Attachment Shoe | 10 | Threaded Hole |
| 3 | Powered Handle Remote | 11 | Coin Cell Battery |
| 4 | Tripod Adapter | 12 | Molded Feet |
| 5 | Smartphone | 13 | Counter Balance Weight |
| 6 | Locking Mechanism | 14 | Lanyard Loop |
| 7 | Trigger | 15 | Rubber Grips |
| 8 | Buttons | 16 | Wrist Angle |

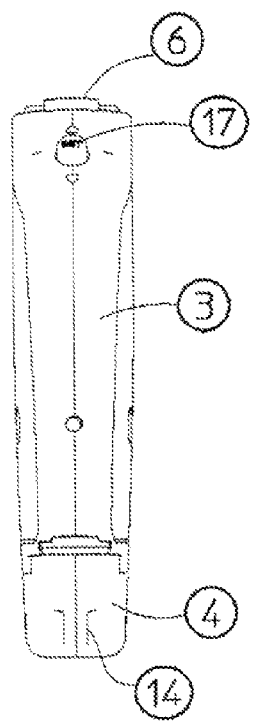
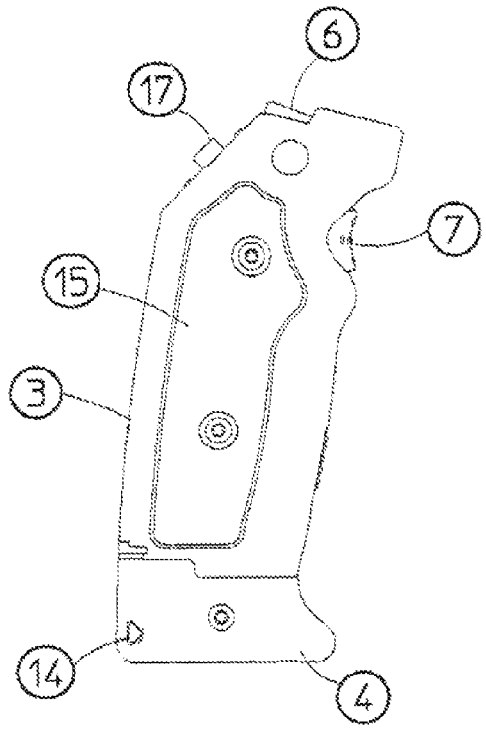
FIG. 7A   FIG. 7B
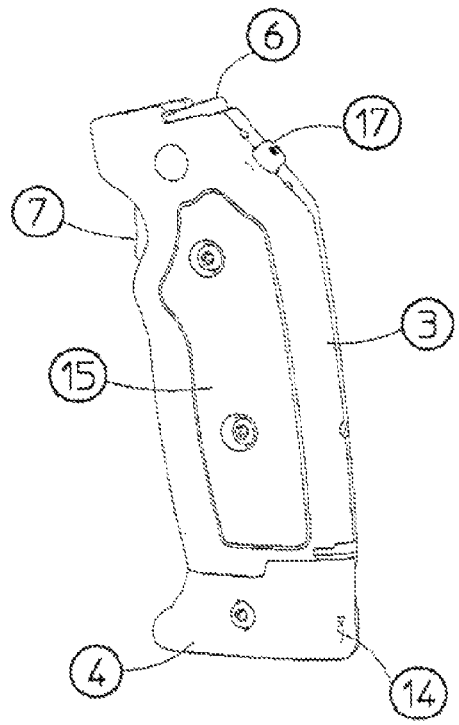
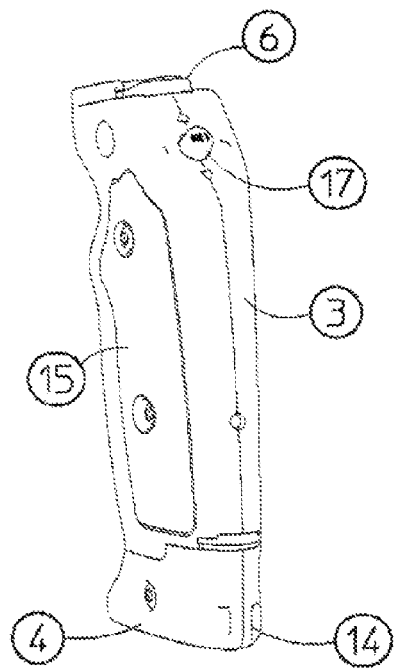
FIG. 7C   FIG. 7D

POWERED PORTABLE HANDLE REMOTE SYSTEM FOR MOBILE COMMUNICATIONS DEVICE

FIELD OF THE INVENTION

The present invention relates to a system used for controlling a mobile communications device's application using a powered remote handle using wireless technology. Specifically, the invention provides the user using a mobile communications device the ability to control various functions of the mobile communications device application without having to touch the mobile communications device screen.

BACKGROUND

Mobile devices are becoming more advanced every day. As technology converges, mobile communications devices are beginning to take the place of other hardware including cameras and gaming consoles. Because of this, more people are using their phones to capture photos/video and play games thus the need for an advanced mobile communications device handle was presented.

We are living in a digital age where everything is captured and recorded using our devices. The latest mobile communications devices are now not only being used as cameras, but as camcorders as well. The convenience of always having a recording device close by has inspired more people to capture photos and video. Mobile communications devices by themselves deliver excellent video quality but because of their small size and shape they are awkward to hold and operate over time.

Playing a game on a mobile communications device can be awkward as well. To control the game functions, programmers use valuable screen space for software buttons. The more controls that are required to operate the game the less there is to display the scene or action of the game.

The powered portable handle remote system for mobile communications device solves this problem by providing a handle for the mobile communications device along with the functionality and ease of wirelessly controlling the mobile communications device applications without touching the screen.

SUMMARY OF THE INVENTION

The powered portable handle remote is a 3 piece system that wirelessly controls the various features of the mobile communications device's application using buttons and/or a joystick. (See FIGS. 1, 2, and 7A-7D)

The first part of the system is the mobile communications device case (1). The mobile communications device case (1) varies from other phone cases due to the unique built-in sliding attachment shoe (2) used to secure mobile communications device case (1) to the powered handle remote (3) and the detachable section, such as a tripod adapter (4). Any mobile communications device (5) can be used provided a mobile communications device case (1) is produced specific to the mobile communications device (5) make and model.

The second part of the system is the powered handle remote (3) which is designed for comfort and functionality. The top of the powered handle remote (3) contains a built-in locking mechanism (6) by which the mobile communications device case's sliding attachment shoe (2) is secured. The powered handle remote (3) utilizes a wrist angle (16) at the top so that the user's forearm and wrist will be parallel in use to reduce fatigue. A trigger (7) and a set of buttons (8) allow the user to control the various features of the mobile communications device's application. Additional buttons and/or a joystick (17), shown in FIGS. 7A-7D, can be added to the powered handle remote (3) to increase the amount of functions controlled on the mobile communications device's application. Elastomeric sides (15) add comfort and grip to the handle securing the powered handle remote (3) in the hand. A counter-balance weight (13) within the grip gives the entire system stability while in use.

The final part of the system is the detachable section, such as the tripod adapter (4). The tripod adapter (4) attaches to the bottom of the powered handle remote (3) and is released from the powered handle remote (3) when a slide action button (9) is activated. The separated tripod adapter (4) can be used to connect the mobile communications device case (1) to a camera tripod using the threaded hole (10) on the underside or set down on a flat surface and used as a miniature tripod. The same slide action button (9) is also used to release a coin cell battery (11) from its holder once depleted. The locking mechanism (6) on the powered handle remote (3) can also be found on the tripod adapter (4). Support structures, such as feet (12), on the underside of the tripod adapter (4) prevent the system from rocking.

BRIEF DESCRIPTION OF THE DRAWINGS

Figure 1:
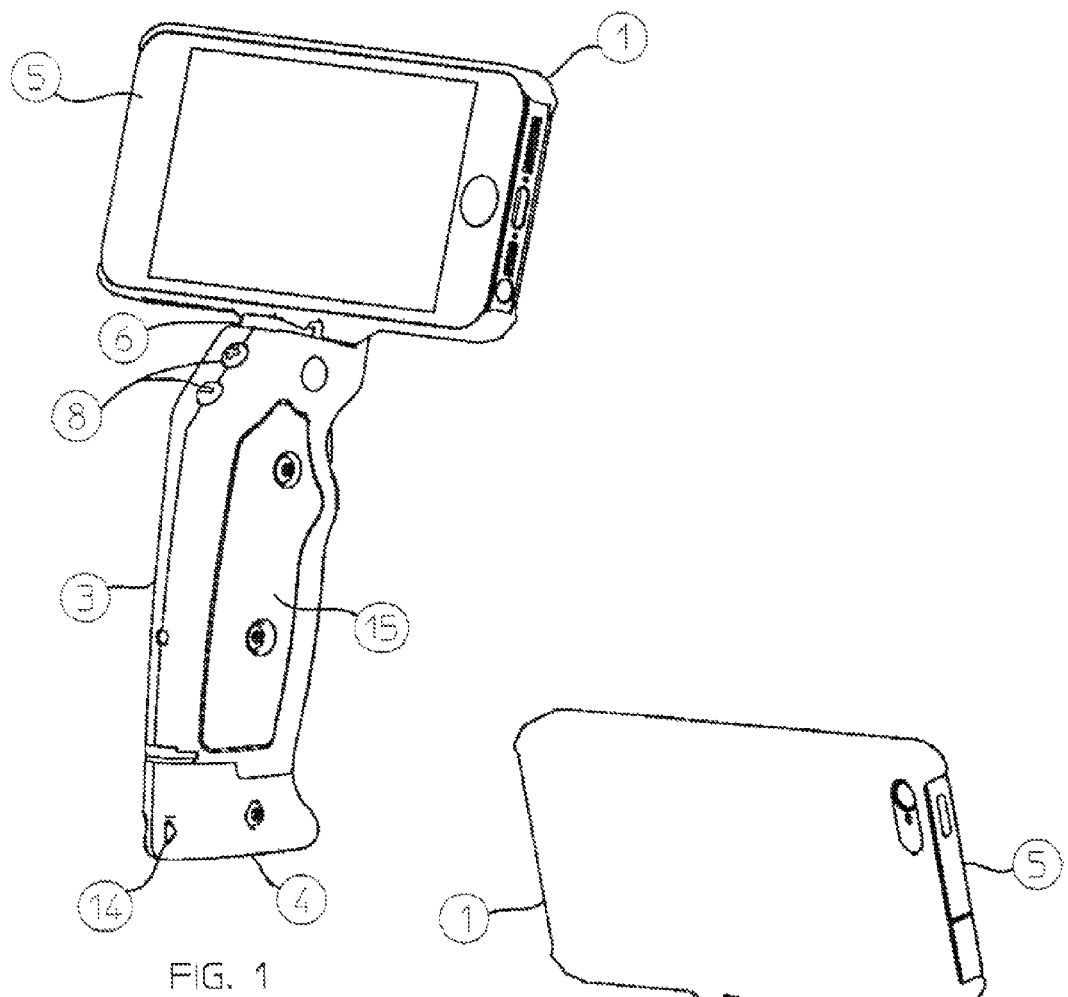

Having thus described the invention in general terms, reference will now be made to the included drawings, which are not necessarily drawn to scale, and wherein:

FIG. 1 shows a front isometric view of the powered portable handle remote system.

Figure 2:
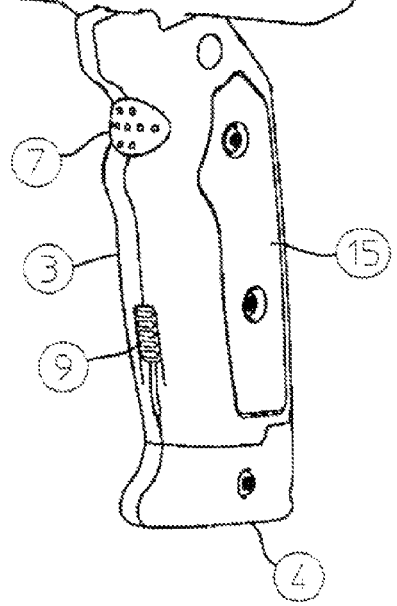

FIG. 2 shows a rear isometric view of the powered portable handle remote system.

Figure 3:
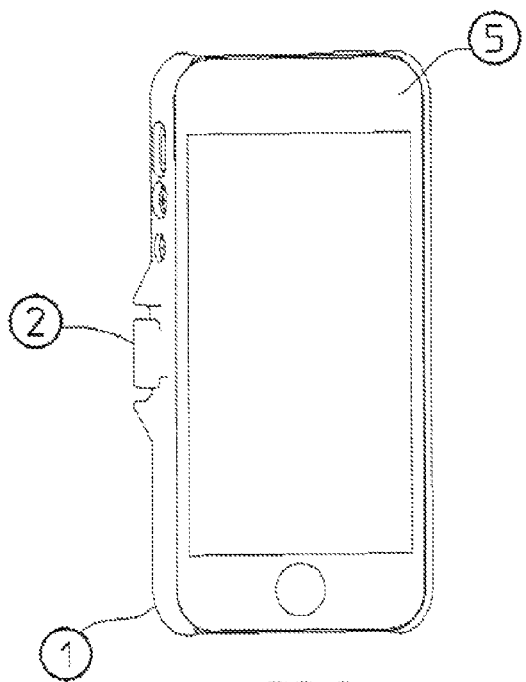

FIG. 3 shows the mobile communications device case detached from the powered portable handle remote system.

Figure 4:
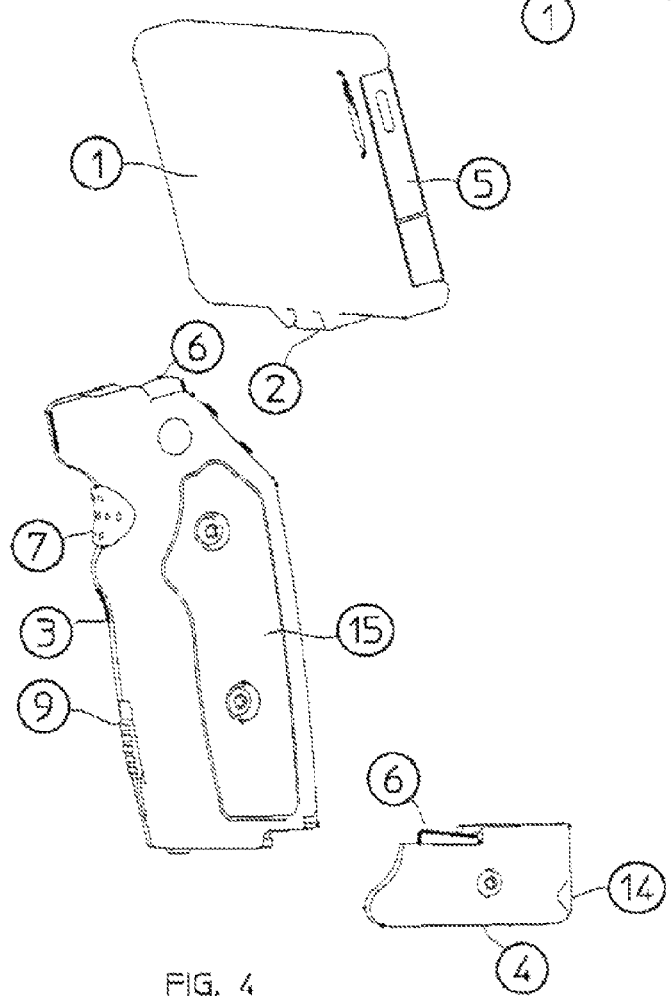

FIG. 4 shows the mobile communications device case and tripod adapter being unlocked and removed from the powered handle remote.

Figure 5:
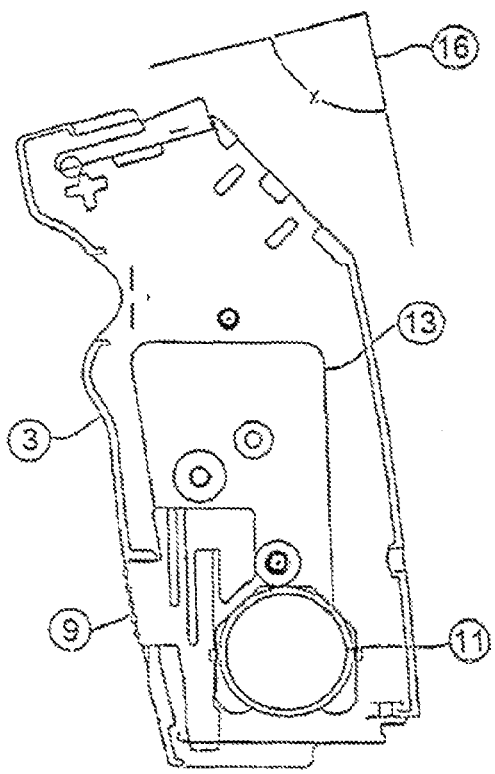

FIG. 5 shows a section view of the powered handle remote.

Figure 6:
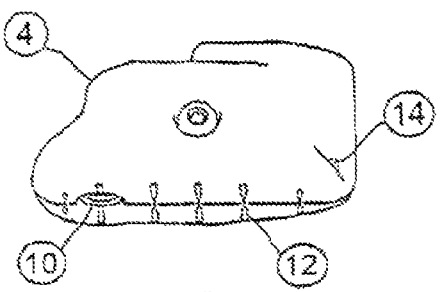

FIG. 6 shows a front underside isometric view of the tripod adapter.

FIG. 7A shows a front plan view of the powered portable handle remote system including joystick.

FIG. 7B shows a side plan view of the powered handle remote system including a joystick.

FIG. 7C shows a side perspective view of the powered handle remote system including a joystick.

FIG. 7D shows a perspective view of the powered handle remote system including a joystick.

The invention claimed is:

1. A system to wirelessly control an application on a mobile communications device, the system comprising:
    a powered handle remote;
    a mobile communications device case removably attached to the powered handle remote;
    an application software installed on the mobile communications device adapted to wirelessly communicate with the powered handle remote and interface with the mobile communications device's application;
    said powered handle remote including at least one of a trigger, at least one button, and a joystick, said at least one of the trigger, at least one button and joystick adapted to wirelessly actuate a function of the mobile communications device through the application software; and
    a detachable section adapted to support and stabilize the mobile communications device case at a distance, said detachable section including a slide action button adapted to release the detachable section from the powered handle remote when activated.

2. A system to wirelessly control an application on a mobile communications device, the system comprising:

a powered handle remote;

a mobile communications device case removably attached to the powered handle remote;

an application software installed on the mobile communications device adapted to wirelessly communicate with the powered handle remote and interface with the mobile communications device's application;

said powered handle remote including at least one of a trigger, at least one button, and a joystick, said at least one of the trigger, at least one button and joystick adapted to wirelessly actuate a function of the mobile communications device through the application software;

a detachable section adapted to support and stabilize the mobile communications device case at a distance, said detachable section including a slide action button adapted to release the detachable section from the powered handle remote when activated; and said slide action button adapted to release a coin cell battery.

* * * * *